United States Patent
Imasaka et al.

(10) Patent No.: US 11,666,867 B2
(45) Date of Patent: Jun. 6, 2023

(54) ZEOLITE SEPARATION MEMBRANE AND PRODUCTION METHOD THEREFOR

(71) Applicants: HITACHI ZOSEN CORPORATION, Osaka (JP); THE SCHOOL CORPORATION KANSAI UNIVERSITY, Osaka (JP)

(72) Inventors: Satoshi Imasaka, Osaka (JP); Masaya Itakura, Osaka (JP); Kazuhiro Yano, Osaka (JP); Hideki Yamamoto, Osaka (JP); Sadao Araki, Osaka (JP)

(73) Assignees: HITACHI ZOSEN CORPORATION, Osaka (JP); THE SCHOOL CORPORATION KANSAI UNIVERSITY, Osaka (JP)

( * ) Notice: Subject to any disclaimer, the term of this patent is extended or adjusted under 35 U.S.C. 154(b) by 118 days.

(21) Appl. No.: 17/221,115

(22) Filed: Apr. 2, 2021

(65) Prior Publication Data
US 2021/0220779 A1    Jul. 22, 2021

Related U.S. Application Data

(63) Continuation of application No. 15/999,806, filed as application No. PCT/JP2017/005843 on Feb. 17, 2017, now Pat. No. 10,994,246.

(30) Foreign Application Priority Data

Feb. 19, 2016   (JP) .................................. 2016-030475

(51) Int. Cl.
*B01D 71/02* (2006.01)
*C01B 37/02* (2006.01)
(Continued)

(52) U.S. Cl.
CPC ......... *B01D 71/028* (2013.01); *B01D 53/228* (2013.01); *B01D 67/0051* (2013.01);
(Continued)

(58) Field of Classification Search
None
See application file for complete search history.

(56) References Cited

U.S. PATENT DOCUMENTS

2001/0020416 A1*   9/2001   Yoshikawa ........ B01D 67/0051
                                                              95/45
2006/0115398 A1    6/2006   Yuen
(Continued)

FOREIGN PATENT DOCUMENTS

CN      101279206 A    10/2008
EP      1824784 A1      8/2007
(Continued)

OTHER PUBLICATIONS

Notification of the Second Office Action dated Dec. 21, 2020 issued in corresponding Chinese Patent Application No. 201780009160.4 with English translation (19 pgs.).
(Continued)

*Primary Examiner* — Jason M Greene
(74) *Attorney, Agent, or Firm* — Pillsbury Winthrop Shaw Pittman, LLP

(57) ABSTRACT

Provided are an all-silica zeolite separation membrane for separating carbon dioxide, etc., and not causing a decrease in the processing amount due to adsorption of water molecules, and a production method therefor. One aspect of the present invention is a zeolite separation membrane, in which the framework of a zeolite crystal structure formed on a porous support is all silica, characterized in that the zeolite crystal structure formed on the porous support is fluorine free. Another aspect of the present invention is a method for
(Continued)

producing a zeolite separation membrane having a zeolite crystal structure on a porous support, characterized in that the method includes a step of producing a seed crystal, a step of applying the seed crystal onto the porous support, a step of producing a membrane synthesis raw material composition, and a step of immersing the porous support having the seed crystal applied thereon in the membrane synthesis raw material composition and performing hydrothermal synthesis, and the membrane synthesis raw material composition contains a silica source and an organic template and does not contain a fluorine compound.

4 Claims, 4 Drawing Sheets

(51) Int. Cl.
  *B01D 53/22* (2006.01)
  *B01D 67/00* (2006.01)
(52) U.S. Cl.
  CPC ........ *C01B 37/02* (2013.01); *B01D 2256/245* (2013.01); *B01D 2257/504* (2013.01)

(56) References Cited

U.S. PATENT DOCUMENTS

| | | | |
|---|---|---|---|
| 2006/0115415 A1* | 6/2006 | Yuen | ........................ C01B 39/48 423/700 |
| 2007/0098630 A1 | 5/2007 | Chen | |
| 2007/0286798 A1 | 12/2007 | Cao | |
| 2015/0014243 A1 | 1/2015 | Yu | |
| 2017/0225129 A1* | 8/2017 | Miyahara | ............. B01D 71/028 |

FOREIGN PATENT DOCUMENTS

| | | |
|---|---|---|
| EP | 3127866 A1 | 2/2017 |
| EP | 3167953 A1 | 5/2017 |
| JP | 2004-083375 A | 3/2004 |
| JP | 2005-270125 A | 10/2005 |
| JP | 2008-521744 A | 6/2008 |
| JP | 2009-513475 A | 4/2009 |
| JP | 2009-114007 A | 5/2009 |
| JP | 2009-214101 A | 9/2009 |
| JP | 2015-116532 A | 6/2015 |
| WO | 2013/143194 A1 | 10/2013 |
| WO | 2016/006564 A1 | 1/2016 |
| WO | 2015/151854 A1 | 4/2017 |

OTHER PUBLICATIONS

Common-Knowledge Document 1: "Cooling and Low Technologies", Nishian Traffic University, et al., Desktop Machinery Publishing Co., Ltd. May 1, 1981, Publication Date May 31, 1981, w/English language summary of relevance (4 pgs.).

Common-Knowledge Document 2: "U-Technologies", Yuqing, et al., Weapon Industry Publishers, Mar. 2006, First edition, Publication Date: Mar. 31, 2006, w/English language summary of relevance (5 pgs.).

Office Action dated Jul. 1, 2020 issued in corresponding Chinese Patent Application No. 20178009160.4 with English translation.

International Search Report PCT/JP2017/005843 dated Apr. 11, 2017 with English translation.

Extended European Search Report EP Application No. 17753311.4 dated Sep. 20, 2019.

Decision of Refusal dated Jul. 6, 2021, issued in corresponding Japanese Patent Application No. 2018-500220 with English translation (6 pgs.).

* cited by examiner

ZEOLITE SEPARATION MEMBRANE AND PRODUCTION METHOD THEREFOR

CROSS-REFERENCE TO RELATED APPLICATIONS

This application is a Continuation Application of U.S. patent application Ser. No. 15/999,806, filed Aug. 20, 2018, which is the U.S. National Stage of PCT/JP2017/005843, filed Feb. 17, 2017, which in turn claims priority to Japanese Patent Application No. 2016-030475, filed Feb. 19, 2016. The contents of each of these applications is incorporated herein by reference in entirety.

TECHNICAL FIELD

The present invention relates to an all-silica zeolite separation membrane and a method for producing an all-silica zeolite separation membrane without using hydrofluoric acid. In particular, it can be favorably used in zeolite separation membranes having an STT-type or CHA-type zeolite crystal structure.

BACKGROUND ART

Zeolite has regularly arranged micropores, and in general, many zeolites which have high heat resistance and are also chemically stable are obtained, and therefore, it has been used in various fields. Zeolite is generally an aluminosilicate in which Si is partially substituted with Al (having a three-dimensional network structure in which $SiO_4$ and $AlO_4$ are bonded by sharing oxygen as a basic framework structure), has pores of a molecular order (about 0.3 to 1 nm) of oxygen 8- to 14-membered ring, and has a stereoselective adsorption ability. Therefore, zeolite is widely used in the fields of, for example, liquid separation, vapor separation, gas separation, membrane reactors, solid acid catalysts, separation adsorbents, ion exchangers, and so on. Recently, a membrane separation method using a zeolite membrane has been proposed in place of a distillation method which requires much heat energy for separation and collection of an organic compound from a mixture containing the organic compound, and there is also a case where the method has already been put into practice.

However, with respect to zeolite, it is known that the hydrophilicity or hydrophobicity of a zeolite membrane or the selectivity or permeation performance for molecules passing through the pores in the zeolite membrane varies depending on the ratio of $SiO_2$ to $Al_2O_3$ (silica ratio: $SiO_2/Al_2O_3$) to serve as the constituent components. Further, it is also known that the chemical resistance or the like differs depending on the change in the ratio of $SiO_2$ to $Al_2O_3$.

In general, as the silica ratio (the ratio of $SiO_2$ to $Al_2O_3$) is increased, the hydrophobicity (lipophilicity) is increased, and also the chemical resistance is increased, and there is a tendency that a zeolite membrane having a high silica ratio is demanded.

Further, in natural gas such as methane mined from a natural gas oil field, other than carbon dioxide, water having a molecular diameter close to that of carbon dioxide and the like are also contained. Therefore, when natural gas and carbon dioxide are tried to be separated, other than carbon dioxide, also water molecules and the like penetrate into zeolite membrane pores.

In a conventional zeolite membrane having an aluminosilicate crystal structure, aluminum atoms are present in the crystal structure, and therefore, it has a problem that water adsorption occurs on the aluminum atoms and carbon dioxide hardly comes out from the pores, and thus, a desired processing amount cannot be obtained.

In order to achieve an object to improve this processing amount, an all-silica zeolite membrane has been demanded. In particular, STT-type and CHA-type zeolite separation membranes for separating methane or the like or carbon dioxide or the like could not be industrially realized due to a problem related to the below-mentioned production method.

That is, a zeolite separation membrane is synthesized using a method of a thermal synthesis method from a raw material composition, and this raw material composition contains a silica source such as sodium silicate or colloidal silica, an aluminum source such as aluminum hydroxide or sodium aluminate, water, a structure directing agent such as an organic template, and a mineralizer such as an alkali metal hydroxide.

This mineralizer has a function to dissolve a metal component contained in the raw material composition in water.

In the case where zeolite is an aluminosilicate, as the mineralizer, NaOH (sodium hydroxide) is generally used. However, when NaOH is used as the mineralizer for synthesizing an all-silica STT-type or all-silica CHA-type zeolite membrane, there is a problem that zeolite is not crystallized (solidified) even if hydrothermal synthesis is performed, and in order to solve this problem, there is a method using hydrofluoric acid in place of NaOH.

For example, PTL 1 to PTL 3 show a method for producing a pure silica zeolite crystal in a particulate form (not a zeolite membrane) of an STT type, a CHA type, or the like for the purpose of separating carbon dioxide or the like by an adsorption method, and hydrofluoric acid is used as a mineralizer.

It is said that this hydrofluoric acid has a crystallization acceleration effect of accelerating dissolution or crystallization of a raw material composition gel, a structure determination effect of synthesizing a compound having a certain structure and composition by the coexistence of fluoride ions, and a template effect of stabilizing the structure in the same manner as an organic template by being incorporated into the framework of a compound.

However, this hydrofluoric acid has problems that it has very high toxicity and is not suitable for the production of a large structure such as a zeolite membrane complex, it takes great time and effort to completely wash away hydrofluoric acid adhered to the surface of a zeolite separation membrane also after synthesis, and the production method is very complicated.

Further, in the case where hydrofluoric acid remains in a washing step after synthesis, there is a problem that the purity of a zeolite separation membrane permeate or non-permeate (product) is deteriorated.

CITATION LIST

Patent Literature

PTL 1: JP-A-2009-114007
PTL 2: JP-A-2009-214101
PTL 3: JP-A-2015-116532

SUMMARY OF INVENTION

Technical Problem

In view of the above-mentioned problems of the prior art, an object of the present invention is to provide an all-silica zeolite separation membrane which does not cause a decrease in the processing amount due to adsorption of water molecules (which separates carbon dioxide or the like).

Further, in view of the above-mentioned problems in the production of the prior art, an object of the present invention is to provide a safe method for producing an all-silica zeolite separation membrane without using hydrofluoric acid.

Solution to Problem

In order to achieve the above object, the present invention provides the following zeolite separation membrane, a membrane synthesis raw material composition for producing the zeolite separation membrane, and a method for producing the zeolite separation membrane.

(1) A zeolite separation membrane, in which the framework of a zeolite crystal structure formed on a porous support is all silica, characterized in that the zeolite crystal structure formed on the porous support is fluorine free.

(2) The zeolite separation membrane according to the above (1), characterized in that the zeolite crystal structure is an STT type or a CHA type.

(3) A raw material composition for producing the zeolite separation membrane according to the above (1) or (2), characterized in that the raw material composition contains a silica source and an organic template and does not contain a fluorine compound.

(4) A method for producing a zeolite separation membrane having a zeolite crystal structure on a porous support, characterized in that the method includes a step of producing a seed crystal, a step of applying the seed crystal onto the porous support, a step of producing a membrane synthesis raw material composition, and a step of immersing the porous support having the seed crystal applied thereon in the membrane synthesis raw material composition, and performing hydrothermal synthesis, and the membrane synthesis raw material composition contains a silica source and an organic template and does not contain a fluorine compound.

(5) The method for producing a zeolite separation membrane according to the above (4), characterized in that the hydrothermal synthesis temperature and time are from 140° C. to 180° C. and from 8 days to 12 days.

In the present invention, the term "fluorine free" means that in the hydrothermal synthesis of a zeolite membrane, the synthesis is performed without using a fluorine-containing mineralizer such as hydrofluoric acid, and therefore, hydrofluoric acid does not remain in the zeolite membrane, and fluorine is not present in the structure of the zeolite membrane crystallized in the hydrothermal synthesis. Incidentally, a fluorine-containing mineralizer used in the step of producing a seed crystal may be contained in the zeolite membrane. However, the amount thereof is much smaller than the entire synthesized zeolite membrane, and therefore, the zeolite membrane can be said to be substantially fluorine free.

Advantageous Effects of Invention

By using the all-silica STT-type or CHA-type zeolite separation membrane of the present invention, when natural gas such as methane or the like mined from a natural gas oil field and carbon dioxide or the like are separated, carbon dioxide or the like can be separated without causing a decrease in the processing amount due to adsorption of water molecules or the like contained in the natural gas.

According to the production method of the present invention, an all-silica zeolite separation membrane can be safely produced without using a fluorine compound (hydrofluoric acid or the like).

DESCRIPTION OF EMBODIMENTS

Figure 1:
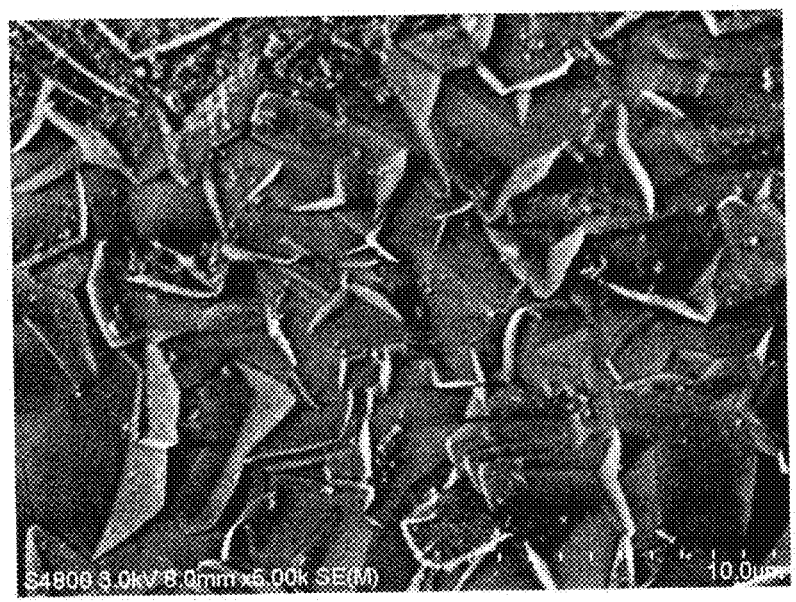
FIG. 1 is an electron micrograph of an all-silica STT-type zeolite membrane obtained in Example 1.

Hereinafter, a zeolite separation membrane according to one embodiment of the present invention will be described in detail.

<Zeolite Separation Membrane>

In the all-silica zeolite separation membrane of the present invention, an all-silica zeolite membrane is formed on the surface of a porous support.

The crystal framework of the all-silica zeolite membrane of the present invention does not substantially contain aluminum and is composed of all silica ($SiO_2$). Aluminum in pores of a general zeolite membrane has a strong adsorption ability and serves as a resistance to a material to be separated when multicomponent separation is desired to be performed. Further, destruction of the zeolite membrane due to acidity or high water content occurs in an aluminum portion in the framework of the zeolite crystal structure. Therefore, the all-silica zeolite membrane of the present invention which does not contain aluminum has very high acid resistance and low adsorption performance for water molecules or the like. The phrase "not substantially contain aluminum" herein is used because there is a possibility that aluminum contained in a porous support may be contained in a very small amount during hydrothermal synthesis.

On the other hand, it is said that there are two types of separation methods by the zeolite separation membrane: separation by a molecular sieving effect utilizing a difference between a zeolite pore diameter and a molecular diameter and separation by an adsorption effect utilizing a difference in the adsorption property on the zeolite membrane of various molecules. The all-silica zeolite separation membrane of the present invention performs separation mainly by a molecular sieving effect.

Then, the STT-type zeolite membrane which is favorably used in the present invention has two types of pores, and the respective pores have sizes of □ 5.3×3.7 Å, and □ 2.4×3.5 Å, respectively. On the other hand, the CHA-type zeolite membrane has a pore with a size of □ 3.8×3.8 Å.

Therefore, for example, molecules whose size is equal to or larger than that of the pores of the zeolite membrane such as methane (3.8 Å), ethanol (4.3 Å), acetic acid (4.3 Å), sulfur hexafluoride (5.5 Å), benzene (6.6 Å), p-xylene (6.6×3.8 Å), and o,m-xylene (7.3×3.9 Å) cannot pass through the pores, and molecules whose size is smaller than that of the pores of the zeolite membrane such as hydrogen (2.9 Å), water (3.0 Å), argon (3.4 Å), carbon dioxide (3.3 Å), oxygen (3.46 Å), nitrogen (3.64 Å), and helium (2.6 Å) can pass through the pores of the zeolite membrane, and therefore, the respective molecules can be separated.

Incidentally, the "STT" and "CHA" are classification codes of zeolite specified based on the structure by the International Zeolite Association (IZA).

The thickness of the zeolite membrane is not particularly limited, and may be any as long as the membrane can be produced as thin as possible, and is preferably about 1.0 μm to 10.0 μm.

The porous support may be any as long as zeolite can be crystallized as a thin membrane on the support, and includes porous supports of alumina, silica, zirconia, titania, stainless steel, and the like. Of course, the porous support has holes larger than the pores of the zeolite membrane, and molecular sieving is achieved by passing molecules having passed through the zeolite membrane through the holes of the porous support.

The shape of the porous support is not particularly limited, and a porous support having any of various shapes such as a tubular shape, a plate shape, a honeycomb shape, a hollow fiber shape, and a pellet shape can be used. For example, in the case of a tubular shape, the size of the porous support is not particularly limited, however, practically, the length is about 2 to 200 cm, the inner diameter is 0.5 to 2.0 cm, and the thickness is about 0.5 to 4.0 mm.

<Method for Producing Zeolite Separation Membrane>

In a step of synthesizing a zeolite membrane, a seed crystal of all-silica zeolite is applied onto the porous support, and the porous support with the seed crystal is immersed in a membrane synthesis raw material composition (gel), and hydrothermal synthesis is performed, whereby an all-silica zeolite membrane is formed.

(Step of Producing Seed Crystal)

As the organic template and the silica source for the seed crystal, preferably, the same ones as used in the synthesis of a desired zeolite crystal are used. As the zeolite seed crystal, a seed crystal is produced by basically the same procedure as the hydrothermal synthesis of the zeolite crystal (separation membrane) except that hydrofluoric acid (hereinafter sometimes referred to as "HF") is used, and the porous support is not used.

The seed crystal for producing the all-silica STT-type zeolite separation membrane is desirably produced, for example, according to the formulation of $SiO_2$:organic template:HF:$H_2O$=1:0.2 to 1.5:0.5 to 1.5:5.0 to 15.0. In particular, it is desirably produced according to the formulation of $SiO_2$:organic template:HF:$H_2O$=1:0.2 to 1.0:0.5 to 1.5:5.0 to 15.0.

The seed crystal for producing the all-silica CHA-type zeolite membrane is desirably produced, for example, according to the formulation of $SiO_2$:organic template:HF:$H_2O$=1:0.5 to 2.5:0.5 to 2.0:2.5 to 8.0. In particular, the seed crystal for producing the all-silica CHA-type zeolite membrane is desirably produced according to the formulation of $SiO_2$:organic template:HF:$H_2O$=1:1.0 to 2.5:0.5 to 1.5:2.5 to 8.0.

A seed synthesis raw material composition (gel) is transferred to a pressure vessel, generally an autoclave, and hydrothermal synthesis is performed. Thereafter, the autoclave is cooled, and the gel is washed with ion exchanged water, filtered, and dried under reduced pressure.

The size of the seed crystal is preferably from 100 nm to 1 μm, more preferably from 100 to 800 nm. When the seed crystal is larger than 1 μm, a dense zeolite layer may not be able to be formed in relation to the pore diameter of the porous support. Incidentally, the particle diameter of the seed crystal can be measured using a particle diameter measuring device (trade name: FPAR-1000) manufactured by Otsuka Electronics Co., Ltd.

In the hydrothermal synthesis of the seed crystal, it is preferred to add the previously prepared seed crystal to a synthesis liquid (synthesis gel). Crystallization of zeolite can be accelerated, and the particle diameter can be controlled.

(Step of Applying Seed Crystal onto Porous Support)

First, with respect to the porous support, in the case where a porous support having the zeolite membrane formed thereon is used as a molecular sieve or the like, it is preferred to set the average pore diameter or the like of the porous support so as to satisfy the following conditions: (a) the zeolite membrane can be rigidly supported, (b) the pressure loss is made as small as possible, and (c) the porous support has a sufficient self-supporting property (mechanical strength).

The porous support is preferably subjected to a surface treatment by a method such as water washing or ultrasonic washing. For example, the surface of the support may be washed by ultrasonic washing with water for 1 to 10 minutes. In order to improve the surface smoothness, the surface thereof may be polished using a sandpaper, a grinder, or the like.

The particle diameter of the seed crystal is desirably smaller, and the seed crystal may be crushed as needed and used. In order to adhere the seed crystal onto the support, for example, a dipping method in which the seed crystal is dispersed in a solvent such as water, and the support is dipped in the dispersion liquid, thereby adhering the seed crystal to the support, a method in which a slurry-like material obtained by mixing the seed crystal with a solvent such as water is rubbed on the surface of the support, or the like can be used. The application amount of the seed crystal is preferably set to, for example, $1×10^{-4}$ to $1×10^{-3}$ wt % with respect to the weight of the support. Then, in order to enhance the adhesiveness, the support after applying the seed crystal thereto is preferably fired at, for example, 450° C. to 700° C.

(Step of Producing Membrane Synthesis Raw Material Composition)

The silica source is not particularly limited, however, preferred examples thereof include amorphous silica, colloidal silica, silica gel, sodium silicate, tetraorthosilicate (TEOS), and trimethylethoxysilane.

As the organic template, an N,N,N-trialkyl-1-adamantanammonium cation derived from 1-adamantanamine is preferred, and it is preferred to use a hydroxide thereof. Among these, N,N,N-trimethyl-adamantanammonium hydroxide (TMAdaOH) is more preferred. Additional examples thereof include N,N,N-trialkylbenzylammonium hydroxide. It is considered that a hydroxy group of such an organic template performs a function as a mineralizer in the gel.

The formulation of the all-silica STT-type zeolite membrane synthesis raw material composition is composed of, for example, only a silica source, an organic template, and $H_2O$, and is, for example, preferably $SiO_2$:TMAdaOH:$H_2O$=1:0.1 to 1.0:20 to 80, more preferably $SiO_2$:TMAdaOH:$H_2O$=1:0.1 to 0.5:30 to 60.

The formulation of the all-silica CHA-type zeolite membrane synthesis raw material composition is composed of, for example, only a silica source, an organic template, and $H_2O$, and is, for example, preferably $SiO_2$:TMAdaOH:$H_2O$=1:0.2 to 1.5:10 to 60, more preferably $SiO_2$:TMAdaOH:$H_2O$=1:0.5 to 1.5:20 to 50.

(Step of Hydrothermally Synthesizing Zeolite Separation Membrane)

In a method for hydrothermally synthesizing an all-silica zeolite separation membrane, after the membrane synthesis raw material composition (gel) which contains a silica source and an organic template and does not contain a fluorine compound is aged, the porous support having the all-silica zeolite seed crystal applied thereon is inserted into the membrane synthesis raw material composition, and hydrothermal synthesis is performed using an airtight vessel, generally, an autoclave. The aging temperature and time are preferably room temperature and from 10 to 24 hours. Specifically, the organic template and the silica source are mixed, stirred, and heated, and generated water and ethanol are removed by evaporation, and thereafter, ion exchanged water is added to the residual solid and stirred while heating. Thereafter, the porous support having the seed crystal applied thereon is placed in a Teflon (registered trademark) inner cylinder, which is filled with a secondary growth solution. This is placed in an autoclave, and hydrothermal synthesis is performed. Thereafter, the formed zeolite separation membrane is washed by boiling with ion exchanged water, and dried under reduced pressure, and then, fired so as to remove the organic template remaining in the membrane. The firing temperature and time are preferably from 450° C. to 700° C. and from 8 to 24 hours. Incidentally, ethanol is generated by hydrolysis and condensation when TEOS is used as the silica source.

The hydrothermal synthesis temperature and time for forming the all-silica STT-type zeolite membrane and the all-silica CHA-type zeolite membrane are preferably from 140° C. to 180° C. and from 6 days to 12 days, more preferably from 8 to 12 days.

Example 1: Production of all-Silica STT-Type Zeolite Separation Membrane (Preparation of Seed Crystal)

In a beaker, TMAdaOH (organic template), TEOS (silica source), and water were mixed, and stirred for 12 hours, whereby TEOS was hydrolyzed. Thereafter, the mixture was heated to 150° C., whereby generated water and ethanol were completely evaporated. To the solid remaining in the beaker, hydrofluoric acid and ion exchanged water were added and stirred. The molar formulation of the respective materials is as follows: $SiO_2$:TMAdaOH:HF:$H_2O$=1:0.5:0.5:7.5. After stirring, the gel was transferred to an autoclave made of Teflon, and hydrothermal synthesis was performed at 150° C. for 3.5 days. The autoclave was cooled, and the gel in the Teflon inner cylinder was washed with ion exchanged water, filtered, and dried under reduced pressure.

The thus prepared all-silica STT-type zeolite seed crystal was applied onto the surface of a porous alumina support (outer diameter: 3 mm, length: about 25 mm, pore diameter: 1.5 μm) which is a test piece by rubbing the seed crystal thereon in an amount of $3\times10^4$ wt % with respect to the weight of the support. Thereafter, the resulting material was fired at 700° C. for 12 hours.

(Synthesis of Zeolite Membrane)

Subsequently, a membrane synthesis raw material composition for membrane synthesis for producing a zeolite membrane was prepared by the following procedure. First, in a beaker, TMAdaOH which is an organic template and TEOS which is a silica source were mixed and stirred for 12 hours. The resulting mixture was heated to 150° C., whereby generated water and ethanol were completely evaporated. To the solid remaining in the beaker, ion exchanged water was added and stirred while heating to 150° C. The molar formulation of the respective materials is as follows: $SiO_2$:TMAdaOH:$H_2O$=1:0.25:44. Thereafter, the porous support having the seed crystal applied thereon was placed in a Teflon inner cylinder, which was filled with a secondary growth solution. This was placed in an autoclave, and hydrothermal synthesis was performed at 150° C. for 8 days. The autoclave was cooled, and the formed zeolite separation membrane was taken out from the Teflon inner cylinder, washed by boiling with ion exchanged water, and dried under reduced pressure. Finally, in order to remove TMAdaOH remaining in the membrane, firing was performed at 500° C. for 10 hours using an electric furnace.

FIG. 1 shows an SEM image of a surface of the synthesized all-silica zeolite separation membrane.

Figure 2:
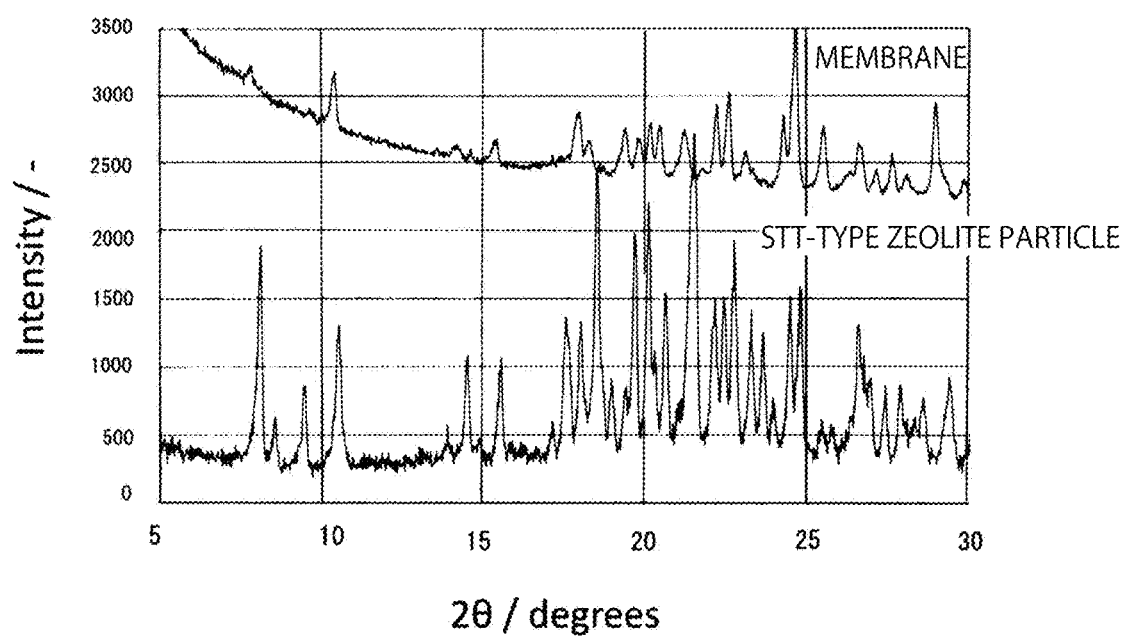
FIG. 2 shows an X-ray diffraction pattern of the all-silica STT-type zeolite separation membrane obtained in Example 1 and an X-ray diffraction pattern of an all-silica STT-type zeolite particle.

FIG. 2 shows an X-ray diffraction pattern (XRD) of an all-silica STT-type zeolite particle and an X-ray diffraction pattern of the zeolite separation membrane produced by the above-mentioned production method. The X-ray diffraction pattern on the lower side is the X-ray diffraction pattern of the all-silica STT-type zeolite particle. The X-ray diffraction pattern on the upper side is the X-ray diffraction pattern of the all-silica zeolite separation membrane produced by the above-mentioned production method. Based on the two X-ray diffraction patterns, the produced zeolite separation membrane was identified to be an all-silica STT-type zeolite membrane.

Example 2: Production of all-Silica STT-Type Zeolite Separation Membrane

Figure 3:
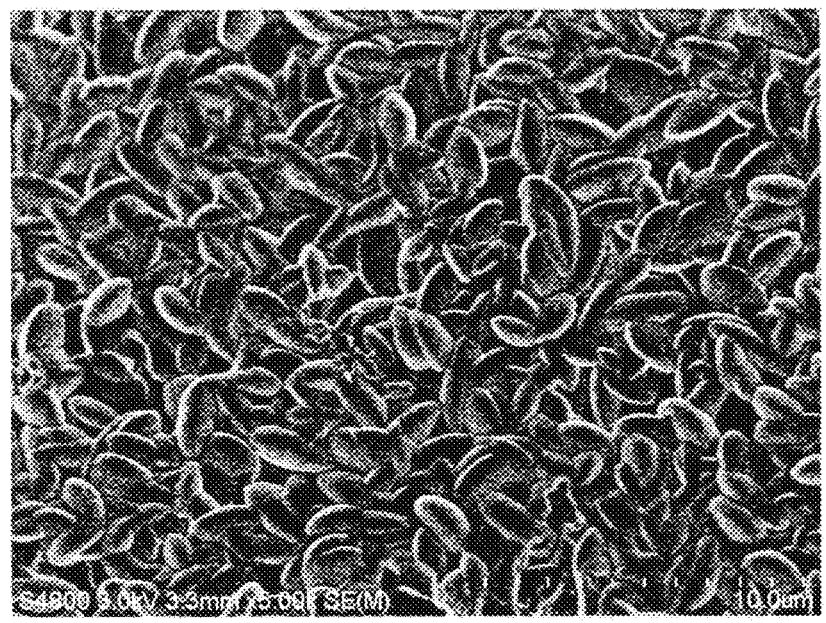
FIG. 3 is an electron micrograph of a surface of an all-silica zeolite membrane of Example 2 synthesized by shortening the hydrothermal synthesis time.

FIG. 3 shows an electron micrograph of a surface of an all-silica zeolite membrane of Example 2 synthesized by shortening the hydrothermal synthesis time.

A membrane was synthesized using the same membrane synthesis raw material composition (gel) as in Example 1. The porous support having the seed crystal applied thereon was placed in a Teflon inner cylinder, which was filled with a secondary growth solution. This was placed in an autoclave, and hydrothermal synthesis was performed at 150° C. for 7 days. The autoclave was cooled, and the formed zeolite separation membrane was taken out from the Teflon inner cylinder, washed by boiling with ion exchanged water, and dried under reduced pressure. Finally, in order to remove TMAdaOH remaining in the membrane, firing was performed at 500° C. for 10 hours using an electric furnace.

<Evaluation Test 1>

With respect to the denseness of the all-silica STT-type separation membrane, an evaluation experiment was performed by pervaporation separation (PV) of an IPA (isopropyl alcohol) aqueous solution (IPA: 90 wt %). The zeolite separation membrane was immersed in the IPA aqueous solution at 75° C., and the pressure inside was reduced using a vacuum pump. Then, the permeated vapor separated by the zeolite separation membrane was collected by liquid nitrogen, and the weight and concentration thereof were measured by a Karl Fischer moisture meter, and the permeation rate and the separation factor of the zeolite separation membrane were obtained.

In the evaluation test, in Example 2, the IPA permeation rate was very large. That is, while the pore diameter of the STT-type zeolite membrane is 0.37 nm, the molecular diameter of IPA is 0.47 nm, and the IPA molecule theoretically cannot permeate into the pore of the membrane by a molecular sieving effect. Therefore, it was considered that the IPA molecule permeated from a defect at a crystal grain boundary or the like, and it was concluded that a dense STT-type zeolite membrane was not obtained when the synthesis time was set to 7 days. On the other hand, in Example 1, the IPA permeation rate was drastically decreased as compared with Example 2, and the separation factor of 15 or less was obtained, and the densification of the zeolite membrane could be confirmed. Incidentally, in Example 2, although the membrane is not dense, an STT-type zeolite membrane is formed.

In FIG. 1 (Example 1) and FIG. 3 (Example 2), crystal form change was observed according to the synthesis time. The zeolite separation membrane of Example 2 was composed of particles in an elliptical form with a size of about several tens of micrometers. On the other hand, the surface of the zeolite membrane of Example 1 was covered with very large angular crystals, and a defect such as a pinhole or a crack was not observed, and it was confirmed that a dense crystal layer was obtained.

<Evaluation Test 2>

Figure 4:
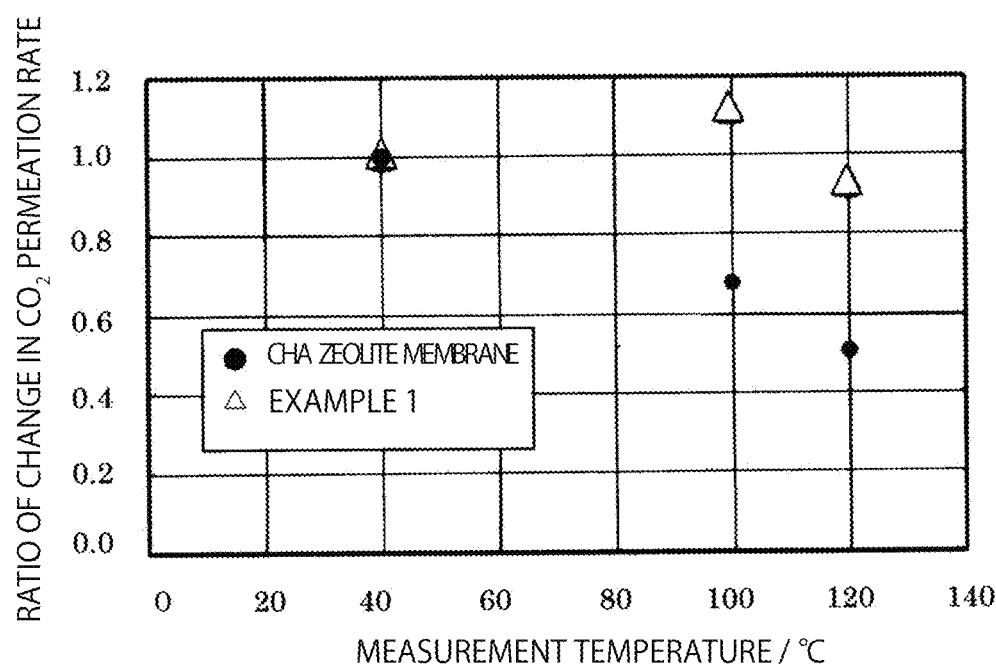
FIG. 4 is a correlation diagram between temperature and a carbon dioxide permeation rate through the all-silica STT-type zeolite separation membrane obtained in Example 1 and a high silica (Si/Al ratio of 25) CHA-type zeolite separation membrane.

FIG. 4 is a diagram showing a correlation between temperature and a carbon dioxide permeation rate through the all-silica STT-type zeolite separation membrane obtained in Example 1 and a high silica (Si/Al ratio of 25) CHA-type zeolite separation membrane.

The high silica (Si/Al ratio of 25) CHA-type zeolite separation membrane was synthesized by supporting a CHA-type seed crystal on the outer surface of a porous alumina support and performing a hydrothermal treatment in a membrane synthesis raw material composition. The seed crystal was obtained by preparing a gel using an FAU-type zeolite powder (manufactured by Tosoh Corporation), sodium hydroxide, an organic template (TMAdaOH), and ion exchanged water and performing a hydrothermal treatment at a predetermined temperature for a predetermined time.

Subsequently, the porous support having the seed crystal supported thereon by dipping or rubbing and the membrane synthesis raw material composition were placed in an autoclave, and a polycrystalline layer was formed by performing a hydrothermal treatment at a predetermined temperature for a predetermined time. After washing, TMAdaOH was removed by firing, whereby the high silica CHA-type zeolite separation membrane was obtained.

The method for producing this high silica CHA-type zeolite membrane is the same as the production method described in "Synthesis of high silica CHA membrane using zeolite as starting material and separation property thereof" reported by Imasaka et al. in the 80th annual meeting of the Society of Chemical Engineers, Japan (see "Synthesis of high silica CHA membrane using zeolite as raw material and separation property thereof" in the 80th annual meeting of the Society of Chemical Engineers, Japan"). Further, the method is also disclosed in WO 2016/006564.

FIG. 4 shows the relationship between the measurement temperature and the $CO_2$ permeation rate for the above-mentioned high silica CHA-type zeolite membrane and the all-silica STT-type zeolite membrane synthesized in Example 1. The measurement was performed in a temperature range from 40 to 120° C., and the flow amount of $CO_2$ gas permeating through the zeolite membrane was measured, and the permeation rate was calculated.

As the measurement temperature was increased, a decrease in the $CO_2$ permeation rate through the high silica CHA-type zeolite separation membrane was observed. By increasing the temperature to 120° C., the permeation rate was decreased to about 50%. On the other hand, in the case of the all-silica STT-type zeolite separation membrane synthesized in Example 1, even if the measurement temperature was increased, almost no change was observed in the $CO_2$ permeation rate. Cationic species such as Na exist for an Al atom of the high silica CHA-type zeolite separation membrane, and it is presumed that when these are exposed to high temperature conditions, the molecular motion thereof becomes active, and therefore, $CO_2$ permeation is inhibited. On the other hand, it is considered that in the all-silica zeolite separation membrane, an Al atom itself is not present, and $CO_2$ smoothly permeates in the pores, and therefore, a decrease due to temperature was not observed.

Example 3: Production of all-Silica CHA-Type Zeolite Separation Membrane (Preparation of Seed Crystal)

In a beaker, TMAdaOH (organic template) and colloidal silica (silica source) were mixed, and hydrofluoric acid was added thereto. Thereafter, the mixture was heated while stirring, whereby water was completely removed. The solid was crushed in an agate mortar and ion exchanged water was added thereto. The molar formulation of the respective materials is as follows: $SiO_2$:TMAdaOH:HF:$H_2O$=1:1.4:1.4:6.0. The gel was transferred to an autoclave made of Teflon, and hydrothermal synthesis was performed at 150° C. for 24 days. The autoclave was cooled, and the gel in the Teflon inner cylinder was washed with ion exchanged water, filtered, and dried under reduced pressure.

The thus prepared all-silica CHA-type zeolite seed crystal was applied onto the surface of a porous alumina support (outer diameter: 16 mm, length: about 40 mm, pore diameter: 1.0 µm) which is a test piece by rubbing the seed crystal thereon in an amount of $3 \times 10^{-4}$ wt % with respect to the weight of the support. Thereafter, the resulting material was fired at 700° C. for 12 hours.

(Synthesis of Zeolite Membrane)

Subsequently, a membrane synthesis raw material composition for membrane synthesis for producing a zeolite membrane was prepared by the following procedure. First, in a beaker, TMAdaOH which is an organic template and TEOS which is a silica source were mixed and stirred for 12 hours. The resulting mixture was heated to 150° C., whereby generated water and ethanol were completely evaporated. To the solid remaining in the beaker, ion exchanged water was added and stirred while heating to 150° C. The molar formulation of the respective materials is as follows: $SiO_2$:TMAdaOH:$H_2O$=1:0.5:44. Thereafter, the porous support having the seed crystal applied thereon was placed in a Teflon inner cylinder, which was filled with a secondary growth solution. This was placed in an autoclave, and hydrothermal synthesis was performed at 150° C. for 8 days. The autoclave was cooled, and the formed zeolite separation membrane was taken out from the Teflon inner cylinder, washed by boiling with ion exchanged water, and dried under reduced pressure. Finally, in order to remove TMAdaOH remaining in the membrane, firing was performed at 500° C. for 10 hours using an electric furnace.

Figure 5:
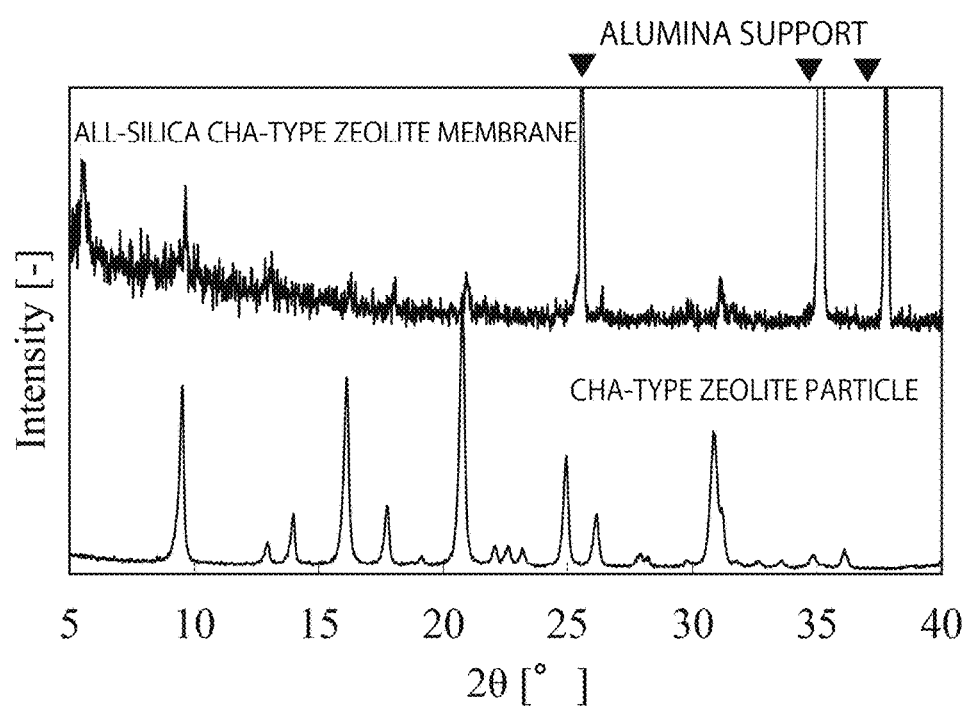
FIG. 5 shows an X-ray diffraction pattern of an all-silica CHA-type zeolite separation membrane obtained in Example 3 and an X-ray diffraction pattern of an all-silica CHA-type zeolite particle.

FIG. 5 shows an X-ray diffraction pattern (XRD) of an all-silica CHA-type zeolite particle and an X-ray diffraction pattern of the zeolite separation membrane produced by the above-mentioned production method. The X-ray diffraction pattern on the lower side is the X-ray diffraction pattern of the all-silica CHA-type zeolite particle. The X-ray diffraction pattern on the upper side is the X-ray diffraction pattern of the zeolite separation membrane produced by the above-mentioned production method. Based on the two X-ray diffraction patterns, the produced zeolite separation membrane was identified to be an all-silica CHA-type zeolite membrane.

Example 4: Production of all-Silica STT-Type Zeolite Separation Membrane

The all-silica STT-type zeolite seed crystal synthesized in Example 1 was applied onto the surface of a porous alumina support having an outer diameter of 16 mm, a length of 40 mm, and a pore diameter of 1.0 μm by rubbing the seed crystal thereon in an amount of $6 \times 10^{-4}$ wt % with respect to the weight of the support. Thereafter, the resulting material was fired at 700° C. for 12 hours.

Subsequently, a membrane synthesis raw material composition for membrane synthesis was prepared by the following procedure. First, in a beaker, TMAdaOH which is an organic template and TEOS which is a silica source were mixed and stirred for 12 hours. The resulting mixture was heated to 150° C., whereby generated water and ethanol were completely evaporated. To the solid remaining in the beaker, ion exchanged water was added and stirred while heating to 150° C. The molar formulation of the respective materials is as follows: $SiO_2$:TMAdaOH:$H_2O$=1:0.25:54. Thereafter, the porous support having the seed crystal applied thereon was placed in a Teflon inner cylinder, which was filled with a secondary growth solution. This was placed in an autoclave, and hydrothermal synthesis was performed at 150° C. for 8 days. The autoclave was cooled, and the formed zeolite separation membrane was taken out from the Teflon inner cylinder, washed by boiling with ion exchanged water, and dried under reduced pressure. Finally, in order to remove TMAdaOH remaining in the membrane, firing was performed at 500° C. for 10 hours using an electric furnace.

Figure 6:
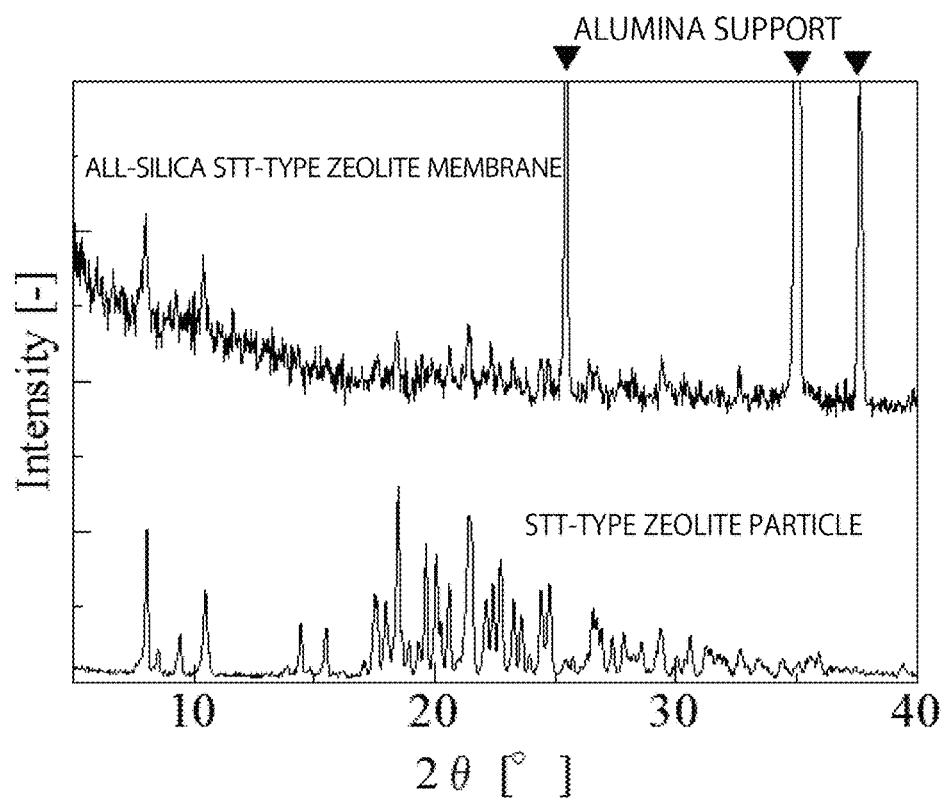
FIG. 6 shows an X-ray diffraction pattern of an all-silica STT-type zeolite separation membrane obtained in Example 4 and an X-ray diffraction pattern of an all-silica STT-type zeolite particle.

FIG. 6 shows an X-ray diffraction pattern (XRD) of an all-silica STT-type zeolite particle and an X-ray diffraction pattern of the zeolite separation membrane produced by the above-mentioned production method. The X-ray diffraction pattern on the lower side is the X-ray diffraction pattern of the all-silica STT-type zeolite particle. The X-ray diffraction pattern on the upper side is the X-ray diffraction pattern of the zeolite separation membrane produced by the above-mentioned production method. Based on the two X-ray diffraction patterns, the produced zeolite separation membrane was identified to be an all-silica STT-type zeolite membrane.

Figure 7:
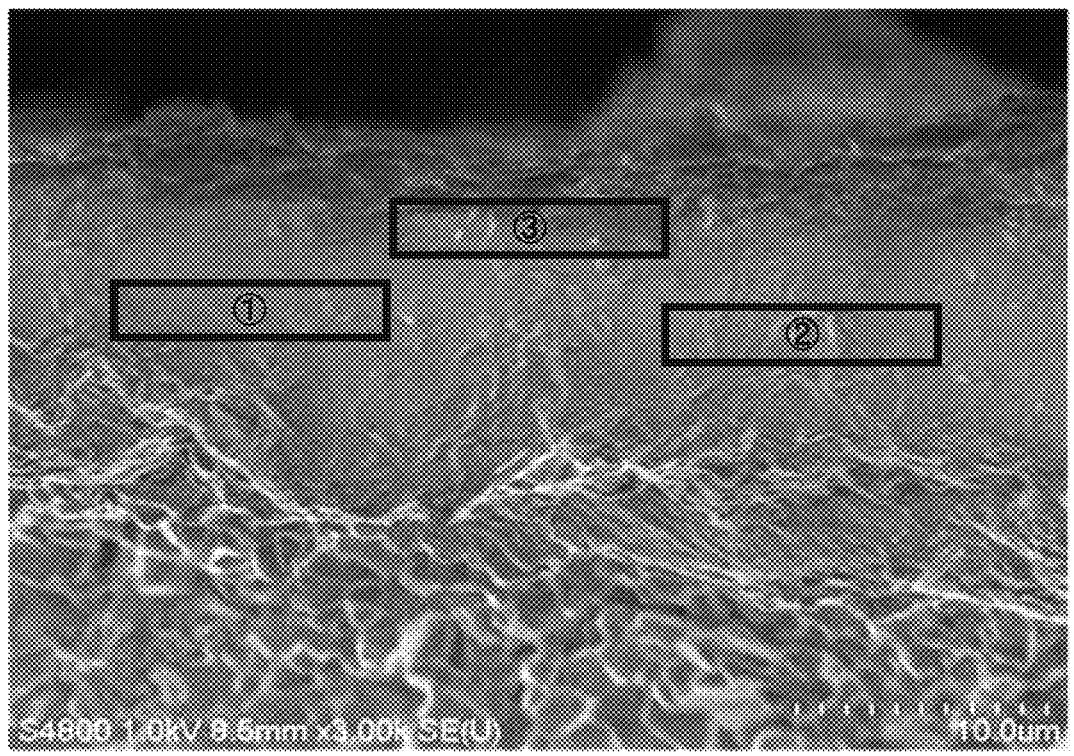
FIG. 7 shows a micrograph of the cross section of the all-silica STT-type zeolite separation membrane obtained in Example 1 and elemental analysis results.

FIG. 7 shows an electron micrograph of the cross section of the all-silica STT-type zeolite membrane obtained in Example 1.

An elemental analysis was performed by EDX measurement (trade name: EMAX ENERGY EX-350, manufactured by HORIBA, Ltd.) for respective portions in FIG. 7. As a result, fluorine atoms were not detected in any portion, and it was found that fluorine is not present in the zeolite membrane synthesized by the method of the present invention. Incidentally, the detection limit of the EDX measurement is 0.00 atom %.

The invention claimed is:

1. A method for producing a zeolite separation membrane having an all-silica CHA-type zeolite crystal structure on a porous support comprising:
    a step of producing a seed crystal of all-silica CHA-type zeolite;
    a step of applying the seed crystal onto the porous support;
    a step of producing a membrane synthesis raw material composition; and
    a step of immersing the porous support having the seed crystal applied thereon in the membrane synthesis raw material composition, and performing hydrothermal synthesis,
    wherein the membrane synthesis raw material composition contains a silica source and an organic template and does not contain a fluorine compound, and
    wherein the membrane synthesis raw material composition consists of the silica source, TMAdaOH and $H_2O$ such that a ratio between the silica source, TMAdaOH, and $H_2O$ is 1:a:b, where a is 0.2 to 1.5 and b is 10 to 60.

2. The method for producing a zeolite separation membrane according to claim 1, wherein the hydrothermal synthesis temperature and time are from 140° C. to 180° C. and from 8 days to 12 days.

3. The method for producing a zeolite separation membrane according to claim 1, wherein a size of the seed crystal of all-silica CHA-type zeolite is from 100 nm to 1 μm.

4. The method for producing a zeolite separation membrane according to claim 2, wherein a size of the seed crystal of all-silica CHA-type zeolite is from 100 nm to 1 μm.

* * * * *